(12) United States Patent
Sato et al.

(10) Patent No.: US 12,554,090 B2
(45) Date of Patent: Feb. 17, 2026

(54) OPTICAL FIBER CABLE

(71) Applicant: SUMITOMO ELECTRIC INDUSTRIES, LTD., Osaka (JP)

(72) Inventors: Fumiaki Sato, Osaka (JP); Satoshi Ohnuki, Osaka (JP); Kenichiro Otsuka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 157 days.

(21) Appl. No.: 18/547,363

(22) PCT Filed: Mar. 31, 2022

(86) PCT No.: PCT/JP2022/016702
§ 371 (c)(1),
(2) Date: Aug. 22, 2023

(87) PCT Pub. No.: WO2022/249756
PCT Pub. Date: Dec. 1, 2022

(65) Prior Publication Data
US 2024/0168248 A1    May 23, 2024

(30) Foreign Application Priority Data

May 24, 2021    (JP) ................................ 2021-086748

(51) Int. Cl.
    *G02B 6/54*       (2006.01)
    *G02B 6/44*       (2006.01)

(52) U.S. Cl.
    CPC ........... *G02B 6/545* (2023.05); *G02B 6/4403* (2013.01)

(58) Field of Classification Search
    CPC .............................. G02B 6/545; G02B 6/4403
    USPC ......................................................... 385/114
    See application file for complete search history.

(56) References Cited

U.S. PATENT DOCUMENTS

| | | | |
|---|---|---|---|
| 2018/0292610 A1* | 10/2018 | Satou | G02B 6/3514 |
| 2019/0004273 A1 | 1/2019 | Faulkner et al. | |
| 2019/0232435 A1* | 8/2019 | DeMeritt | G02B 6/3644 |
| 2019/0384027 A1* | 12/2019 | Hoshino | G02B 6/448 |
| 2020/0277495 A1* | 9/2020 | Fujita | G02B 6/4433 |
| 2022/0342167 A1 | 10/2022 | Sato et al. | |
| 2022/0365300 A1 | 11/2022 | Sato et al. | |

FOREIGN PATENT DOCUMENTS

| | | |
|---|---|---|
| JP | H11-142702 A | 5/1999 |
| JP | 2004-161499 A | 6/2004 |
| JP | 2021-033206 A | 3/2021 |
| WO | 2020-256019 A1 | 12/2020 |
| WO | 2021-045201 A1 | 3/2021 |

OTHER PUBLICATIONS

International Search Report dated Jun. 21, 2022 issued in PCT/JP2022/016702.
Written Opinion dated Jun. 21, 2022 issued in PCT/JP2022/016702.

* cited by examiner

*Primary Examiner* — Jerry M Blevins
(74) *Attorney, Agent, or Firm* — McDonald Hopkins LLC

(57) ABSTRACT

An optical fiber cable includes a cable main body including 3000 or more optical fibers, a sheath material receiving therein the optical fibers, and a multi-fiber connector connected to ends of the optical fibers, in which the sheath material includes 0.2% or more by mass and 1.5% or less by mass of silicone.

7 Claims, 7 Drawing Sheets

OPTICAL FIBER CABLE

TECHNICAL FIELD

The present disclosure relates to an optical fiber cable.

This application claims priority based on Japanese Patent Application No. 2021-086748 filed on May 24, 2021, the contents of which are incorporated herein by reference in its entirety.

BACKGROUND ART

Patent Literature 1 discloses a multi-core optical fiber cable in which a plurality of optical fiber tape core wires are aggregated and integrated with high density.

CITATION LIST

Patent Literature

Patent Literature 1: JP2004-161499A

SUMMARY OF INVENTION

An optical fiber cable according to an aspect of the present disclosure includes: a cable main body including 3000 or more optical fibers and a sheath material receiving therein the optical fibers; and a multi-fiber connector connected to ends of the optical fibers, in which the sheath material includes 0.2% or more by mass and 1.5% or less by mass of silicone.

DESCRIPTION OF EMBODIMENTS

Figure 1:
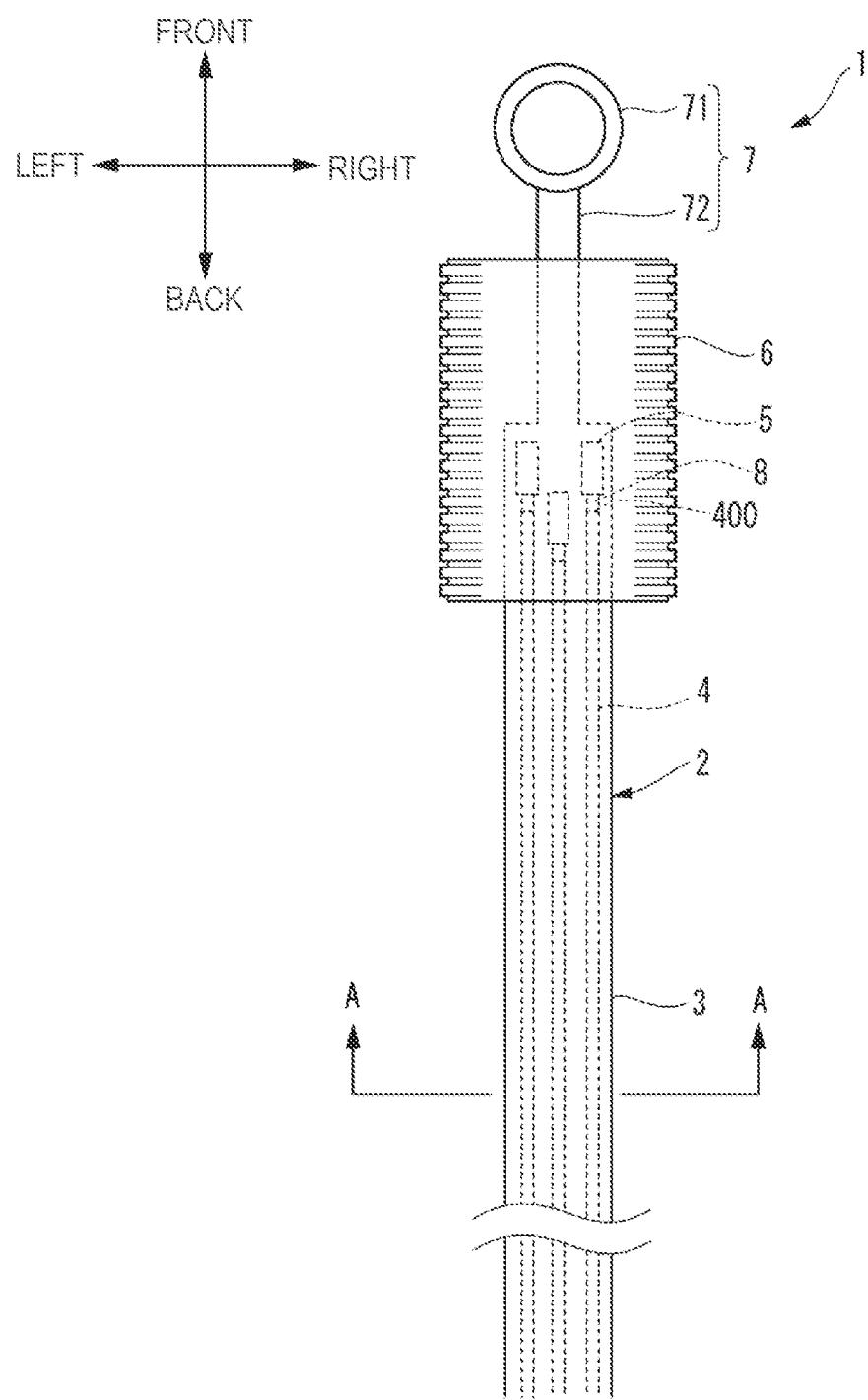
FIG. 1 is a view illustrating an optical fiber cable according to an aspect of the present embodiment.

Technical Problem to be Solved by Present Disclosure

An optical fiber cable for outdoor wiring is often fusion-spliced in a junction box such as a closure during wiring, and is also fusion-spliced or connector-connected in a lead-in portion for the indoor wiring. Therefore, for example, in the case of an ultra-high-fiber-count optical fiber cable including 3000 fibers or more, there is a risk that fusion-splicing may take a long time. In addition, when laying the ultra-high-fiber-count optical fiber cable in a duct with the pulling method, if there is a high occupancy rate of the optical fiber cable in the duct, there is a risk in which the traction tension may increase and the cable passing property may deteriorate. Therefore, there is a need for an optical fiber cable that can improve work efficiency during laying of the optical fiber cable.

An object of the present disclosure is to provide an optical fiber cable that can improve work efficiency during laying of the optical fiber cable.

Description of Embodiments of Present Disclosure

First, embodiments of the present disclosure will be listed and described.

An optical fiber cable according to an aspect of the present disclosure includes:

(1) a cable main body including 3000 or more optical fibers and a sheath material receiving therein the optical fibers; and a multi-fiber connector connected to ends of the optical fibers, in which the sheath material includes 0.2% or more by mass and 1.5% or less by mass of silicone.

According to the configuration described above, the multi-fiber connector is provided at the ends of the optical fibers, the time required for fusion-splicing can be shortened or eliminated. In addition, the sheath material of the optical fiber cable according to the configuration described above includes 0.2% or more by mass and 1.5% or less by mass of silicone. Therefore, when the optical fiber cable is laid in the duct by the pulling method, the friction coefficient between the optical fiber cable and the duct can be reduced. Therefore, the optical fiber cable according to the configuration described above has a good cable passing property. As described, according to the configuration described above, the work efficiency can be improved during laying of the optical fiber cable.

Further, in the optical fiber cable according to an aspect of the present disclosure, (2) it is preferable that a static friction coefficient between the sheath material and a flat plate formed of stainless steel is 0.20 or more and 0.46 or less.

According to the configuration described above, because the static friction coefficient between the sheath material and the flat plate formed of stainless steel is 0.20 or more and 0.46 or less, the optical fiber cable has a good cable passing property.

Further, in the optical fiber cable according to an aspect of the present disclosure, (3) it is preferable that the cross section of the sheath material has a polygonal shape.

According to the configuration described above, because the sheath material has the polygonal cross section, in the cross section of the optical fiber cable, a portion where the duct and the optical fiber cable contact with each other when the optical fiber cable is passed through the duct is a point contact. Therefore, with the optical fiber cable according to the configuration described above, the frictional resistance occurring when passing through the duct can be reduced, so that a good cable passing property is provided during laying of the optical fiber cable.

Further, in the optical fiber cable according to the aspect of the present disclosure, (4) it is preferable that the optical fiber cable has a bending rigidity of 25 N·mm² or less, and that a variation amount of the bending rigidity in a circumferential direction of the optical fiber cable is within 5% of an average value of the bending rigidity.

The optical fiber cable according to the configuration described above is easy to bend and can bend in any direction to a certain degree, and accordingly, has a good cable passing property even when the optical fiber cable is passed through the duct including a plurality of curved parts, for example.

Further, in the optical fiber cable according to the aspect of the present disclosure, (5) while the optical fibers are arranged in parallel, the optical fibers are configured as an optical fiber ribbon with fiber adhesive parts and non-adhesive parts in which the fiber adhesive parts where adjacent optical fibers between some or all of the optical fibers are connected to each other, and the non-adhesive parts where the adjacent optical fibers between some or all of the optical fibers are not connected to each other are intermittently provided in the longitudinal direction.

According to the configuration described above, because the optical fibers are configured as the optical fiber ribbon with fiber adhesive parts and non-adhesive parts, the optical fibers can be easily bundled into subunits. Therefore, a relatively large number of optical fibers can be received in the cable at high density.

Further, it is preferable that the optical fiber cable according to the aspect of the present disclosure further includes (6) a pitch conversion part that is provided between a first end of the optical fiber ribbon and the multi-fiber connector and converts pitch of the optical fibers, in which the pitch of the optical fibers in the multi-fiber connector is longer than the pitch of the optical fibers in the optical fiber ribbon, an outer diameter of the optical fiber is 160 μm or more and 185 μm or less, and a core density of the cable main body is 10 fiber/mm² or more.

According to the configuration described above, even in a high-density optical fiber cable using small-diameter fibers, by converting the pitch of the optical fibers with the pitch conversion part and connecting to the multi-fiber connector in advance, the fusion-splicing time can be shortened. Therefore, with the optical fiber cable including the configuration described above, work efficiency during laying of the optical fiber cable can be improved.

Further, the optical fiber cable according to the aspect of the present disclosure may further include (7) a flexible tube provided on at least one end of the cable main body, in which the multi-fiber connector may be received in the flexible tube.

According to the configuration described above, because the multi-fiber connector is received in the flexible tube, the multi-fiber connector is not exposed and can be prevented from being damaged or separated during pulling.

Further, in the optical fiber cable according to the aspect of the present disclosure, (8) an outer diameter of the flexible tube and an outer diameter of the cable main body are preferably 60 mm or less.

According to the configuration described above, the outer diameters of the flexible tube and the cable main body can be smaller, and also, the optical fiber cable can be the multi-core and high-density cable.

Further, in the optical fiber cable according to the aspect of the present disclosure, (9) it is preferable that a glass diameter of the optical fiber is preferably 80 μm or more and 120 μm or less.

According to the configuration described above, it is possible to prevent a thickness of coating on the optical fiber from being thinned, and thus prevent deterioration of the mechanical strength of the optical fiber cable.

Advantageous Effects of Present Disclosure

According to the present disclosure, an optical fiber cable that can improve work efficiency during laying of the optical fiber cable can be provided.

Details of Embodiments of Present Disclosure

Specific examples of an optical fiber cable according to an embodiment of the present disclosure will be described below with reference to the drawings. Note that the present disclosure is not limited to these examples, but is indicated by the claims, and includes all modifications within the scope and meaning equivalent to the claims.

First Embodiment

Figure 2:
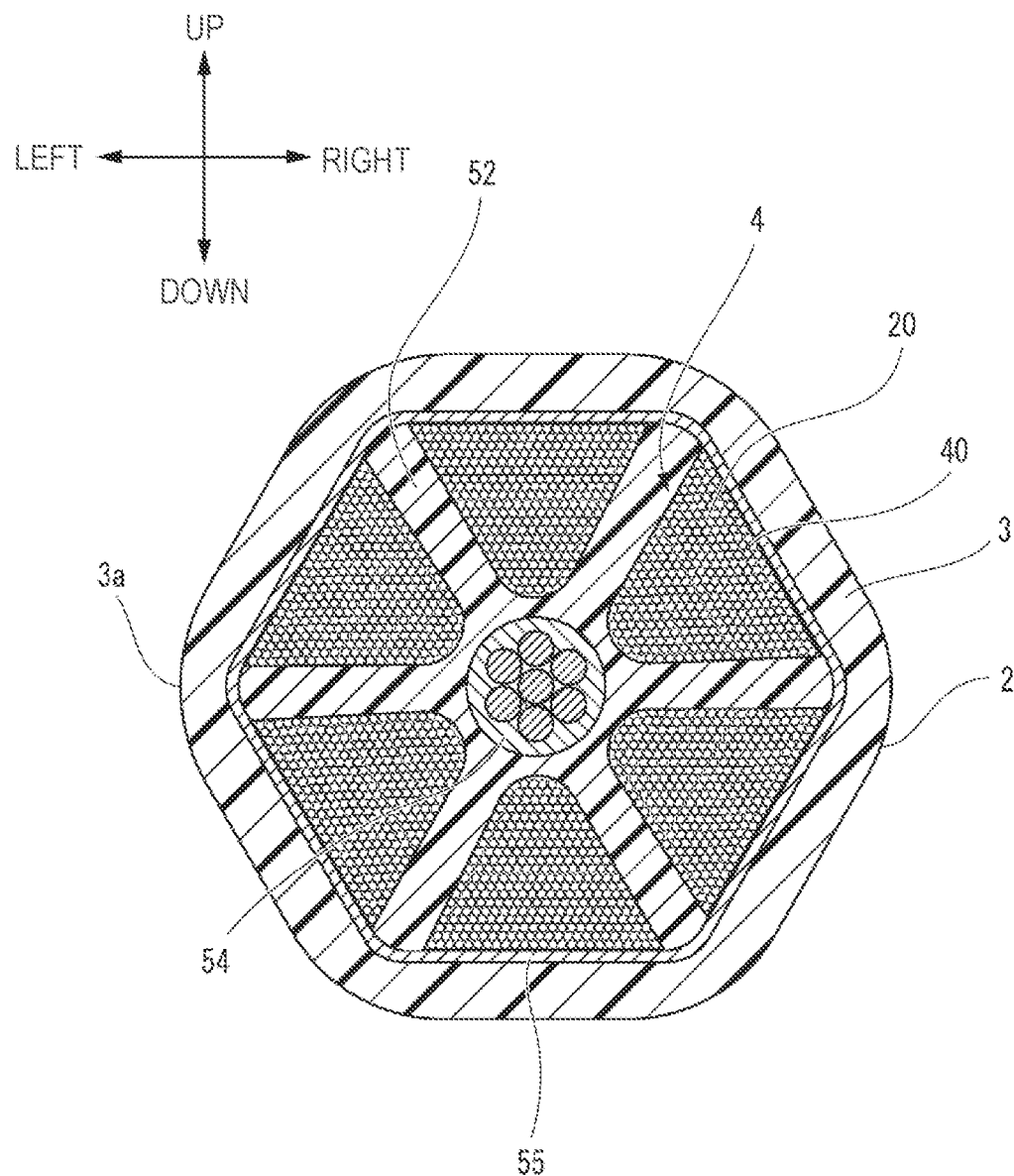
FIG. 2 is a cross-sectional view taken along line A-A in FIG. 1.

An optical fiber cable 1 according to an embodiment will be described with reference to FIGS. 1 and 2. Further, for convenience of description of the present embodiment, the terms "front-rear direction", "left-right direction", and "up-down direction" will be referred to as appropriate. These directions are relative directions established for the optical fiber cable 1 illustrated in FIGS. 1 and 2, the "up-down direction" herein is a direction including an "upward direction" and a "downward direction" with respect to a center of the cable as a zero point in FIG. 2. The "front-rear direction" is a direction including the "upward direction" and the "downward direction" in FIG. 1 ("forward direction" and "rearward direction" in FIG. 2). The "left-right direction" is a direction including a "leftward direction" and a "rightward direction" with respect to the center of the cable as a zero point in FIGS. 1 and 2. FIG. 1 is a view illustrating the optical fiber cable 1. FIG. 2 is a cross-sectional view taken along line A-A in FIG. 1.

As illustrated in FIG. 1, the optical fiber cable 1 includes a cable main body 2, a plurality of multi-fiber connectors 5, a flexible tube 6, a pulling eye 7, and a pitch conversion part 8. As illustrated in FIG. 2, the cable main body 2 includes a slot rod 52, a plurality of subunits 4 and a sheath material 3.

The slot rod 52 includes a tension member 54 in the center, around which a plurality of ribs to form a plurality of slot grooves are provided radially in the cross-sectional view. The slot groove is formed in a unidirectional spiral or SZ shape along the longitudinal direction of the cable main body 2. One or a plurality of subunits 4 are received in each of the plurality of slot grooves.

The subunit 4 includes a plurality of optical fiber ribbons 40 with fiber adhesive parts and non-adhesive parts. For example, the optical fiber ribbon 40 includes 12 optical fibers 20. For example, the outer diameter of each optical fiber 20 is 200 μm. The subunit 4 is formed by bundling the optical fiber ribbons 40 including the optical fibers 20. Specifically, the subunit 4 is formed by rolling and bunch stranding the optical fiber ribbons 40. The subunits 4 may be twisted with each other within the slot groove. For example, the optical fiber 20 includes a glass fiber formed of silica glass or the like, and a coating layer formed around the glass fiber. The glass fiber includes a core portion and a clad portion. The core portion is disposed at a center in the radial direction of the optical fiber 20. The clad portion is disposed so as to cover the periphery of the core portion.

Figure 3:
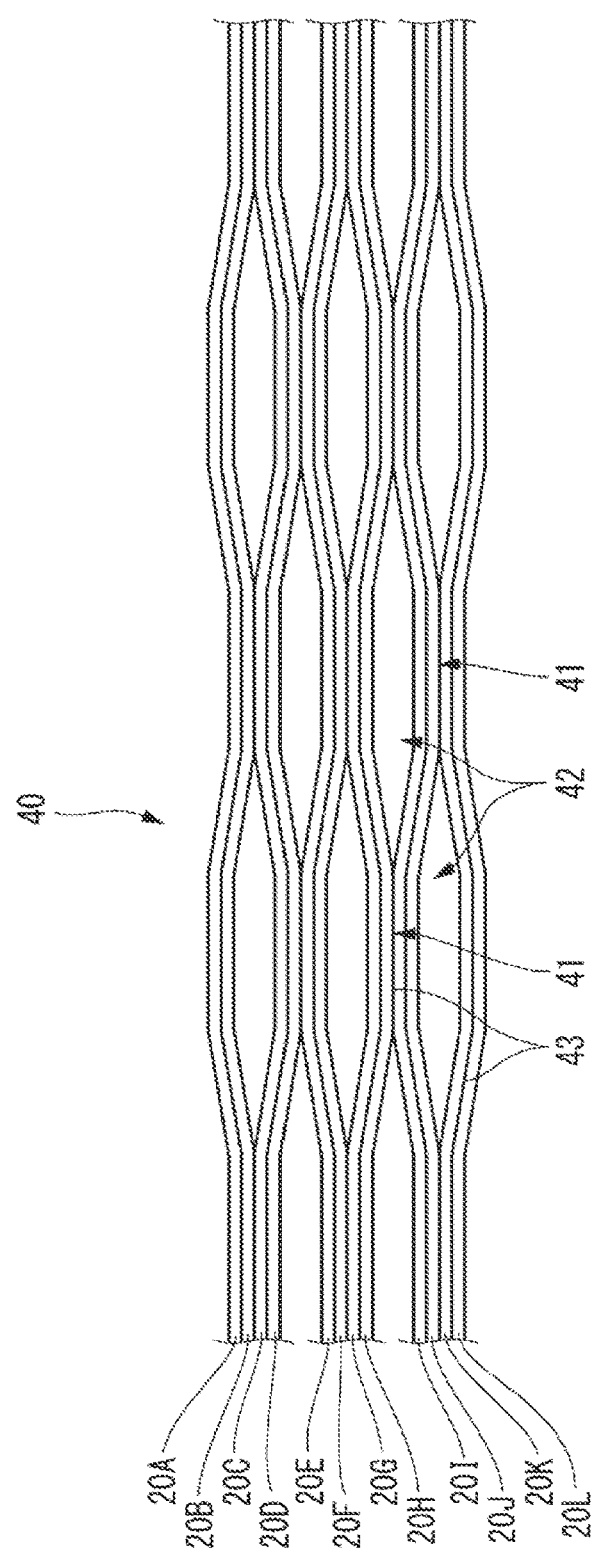
FIG. 3 is a plan view illustrating an optical fiber ribbon with fiber adhesive parts and non-adhesive parts in a longitudinal direction.

The optical fiber ribbon 40 will now be described in detail with reference to FIG. 3. As illustrated in FIG. 3, the optical fiber ribbon 40 is an optical fiber ribbon with fiber adhesive parts and non-adhesive parts arranged in parallel in a direction orthogonal to the longitudinal direction of a plurality of optical fibers 20A to 20L, which includes fiber adhesive parts 41 where the adjacent optical fibers of some or all of the plurality of optical fibers 20A to 20L are connected to each other and non-adhesive parts 42 where the adjacent optical fibers are not connected to each other, in which the fiber adhesive parts 41 and non-adhesive parts 42 are provided intermittently in the longitudinal direction. The outer diameter of each of the optical fibers 20A to 20L is 220 µm or less, for example, 180 µm or 200 µm.

In the optical fiber ribbon 40 according to the embodiment, 12 optical fibers 20A to 20L are arranged in parallel. The positions where the fiber adhesive parts 41 and non-adhesive parts 42 are intermittently provided may be between some of the optical fibers (in every second core), or between all the optical fibers (in every core). The optical fiber ribbon 40 illustrated in FIG. 3 has intermittent parts in every second core, and non-adhesive parts 42 are not provided between the optical fibers 20A and 20B, 20C and 20D, 20E and 20F, 20G and 20H, 20I and 20J, 20K and 20L.

For example, the fiber adhesive part 41 in the optical fiber ribbon 40 is formed by applying, between the optical fibers, a connecting resin 43 including an ultraviolet curable resin, a thermosetting resin, or the like. By applying the connecting resin 43 between certain optical fibers, the fiber adhesive parts 41 and the non-adhesive parts 42 are intermittently provided, and also the respective optical fibers 20A to 20L are integrated in a parallel state. The connecting resin 43 may be applied to only one sides among the parallel sides formed by the optical fibers 20A to 20L arranged in parallel, or may be applied to both sides. Further, the optical fiber ribbon 40 may be manufactured by applying a tape resin on one side or both sides of the optical fibers 20A to 20L arranged in parallel and connecting all the optical fibers 20A to 20L, and then forming the non-adhesive parts 42 by cleaving a portion with a rotary blade or the like.

As illustrated in FIG. 2, a pressing and winding tape 55 is wrapped around the slot rod 52. For example, for the pressing and winding tape 55, a polyethylene terephthalate (PET) formed in a tape shape, or a base material such as PET adhered with a non-woven fabric can be used. A water-absorbing agent (for example, water-absorbing powder) may be applied to an inner side of the pressing and winding tape 55.

The sheath material 3 is formed by extruding and coating an insulating resin around the pressing and winding tape 55. Because the sheath material 3 is formed along the outer peripheral shape of the slot rod 52 and the pressing and winding tape 55, the cross section of the sheath material 3 is in polygonal shape. For example, the sheath material 3 is formed of a resin composition including silicone blended with a resin such as low-density polyethylene. In this embodiment, the sheath material 3 includes 0.2% or more by mass and 1.5% or less by mass of silicone. Further, from the viewpoint of preventing low-temperature shrinkage of the sheath material 3, the sheath material 3 may include an inorganic filler such as magnesium hydroxide or talc.

The outer diameter of the cable main body 2, i.e., the outer diameter of the sheath material 3 is 28 mm, for example. The cable main body 2 includes 3000 or more (for example, 3456) optical fibers 20. Therefore, the optical fiber cable 1 is an ultra-high-fiber-count optical cable. The density of the optical fibers 20 in the optical fiber cable 1 is a core density of 5.6 fiber/mm². When the outer diameter of each optical fiber 20 in the optical fiber ribbon 40 is 200 µm, the core density of the optical fiber cable 1 can be 5 fiber/mm² or more.

As illustrated in FIG. 1, the multi-fiber connector 5 is, for example, a 12-fiber MPO connector including MT connector as a base structure. In this embodiment, the optical fiber cable 1 includes 288 multi-fiber connectors 5, for example. These multi-fiber connectors 5 are received in the flexible tube 6. For convenience of illustration, FIG. 1 shows only 3 multi-fiber connectors 5. The multi-fiber connectors 5 are attached to the end of the optical fiber ribbon 40. That is, the multi-fiber connectors 5 are connected to the ends of the optical fibers 20.

The flexible tube 6 is a cylindrical tube having a bellows-like shape and has flexibility. The flexible tube 6 is provided at the end of the optical fiber cable 1. The surface of the flexible tube 6 is covered with polyvinyl chloride or the like. The outer diameter of the flexible tube 6 may be 60 mm or less, and 60 mm according to the present embodiment. The outer diameter of the flexible tube 6 may be larger than the outer diameter of the cable main body 2 and the outer diameter of a cylindrical portion 72 of the pulling eye 7 which will be described below. The flexible tube 6 has an allowable bending radius of 220 mm, for example. However, the allowable bending radius of the flexible tube 6 is not limited thereto. The flexible tube 6 receives therein an end of the cable main body 2 and an end of the pulling eye 7.

The pulling eye 7 is formed of a material having a sufficient strength to pull the optical fiber cable 1. Such materials include, for example, metals such as iron or the like. The pulling eye 7 includes an annular portion 71 and the cylindrical portion 72. The annular portion 71 is annular in shape. For example, a worker can attach a wire or the like to the annular portion 71 and pull the wire with a winch to pull the optical fiber cable 1. The cylindrical portion 72 has an approximately cylindrical shape. A first end of the cylindrical portion 72 is connected to the annular portion 71, and a second end of the cylindrical portion 72 is connected to the end of the cable main body 2. A part of the cylindrical portion 72 is received in the flexible tube 6.

The pitch conversion part 8 is provided between the first end 400 of the optical fiber ribbon 40 and the end of the multi-fiber connector 5. The pitch conversion part 8 is configured to convert the pitch of the optical fibers 20 into an arrangement pitch of the multi-fiber connector 5. According to an embodiment, the pitch of the optical fibers 20 in the optical fiber ribbon 40 is 200 µm, and the arrangement pitch in the multi-fiber connector 5 is 250 µm. The pitch conversion part 8 converts the pitch of the optical fibers 20 from 200 µm to 250 µm by separating the plurality of optical fibers 20 into single fibers and widening the pitch. Therefore, the plurality of optical fibers 20 are connected to the multi-fiber connector 5 with a pitch of 250 µm.

(Method for Laying the Optical Fiber Cable 1)

A method for laying the optical fiber cable 1 according to the embodiment will be described with reference to FIG. 4. In this description, an example in which the optical fiber cable 1 is passed through a duct 10 disposed in a manhole provided underground will be described. The duct 10 is formed of stainless steel, for example. The duct 10 has an approximately cylindrical shape, for example. The duct 10 includes a plurality of curved parts. On the other hand, the duct 10 may be straight. The duct 10 is fixed to a wall surface or a bottom surface.

The worker passes the wire from an outlet 10b of the duct 10 toward an inlet 10a. The worker connects the wire coming out of the inlet 10a to the annular portion 71 of the pulling eye 7 and pulls the wire from the outlet 10b of the duct 10 with a winch. Accordingly, the optical fiber cable 1 is inserted through the duct 10. Because the cross section of the sheath material 3 has a polygonal shape, a contact portion 3a between the duct 10 and the optical fiber cable 1 (see FIG. 2) when the optical fiber cable 1 is passed through the duct 10 is a point contact in the cross section of the optical fiber cable 1.

The worker pulls the wire connected to the annular portion 71 with the winch until the annular portion 71 comes out from the outlet 10b of the duct 10. When the annular portion 71 comes out from the outlet 10b, the worker disconnects the annular portion 71 and the wire. Then the worker removes the flexible tube 6 and the pulling eye 7 from the optical fiber cable 1 and connects the multi-fiber connector 5 to another optical fiber cable, the optical communication equipment, or the like. That is, without fusion-splicing the optical fiber 20 included in the optical fiber cable 1 to another optical fiber, it is possible to perform connection work easily using the multi-fiber connector 5.

(Measurement of Static Friction Coefficient of Optical Fiber Cable 1)

Figure 5:
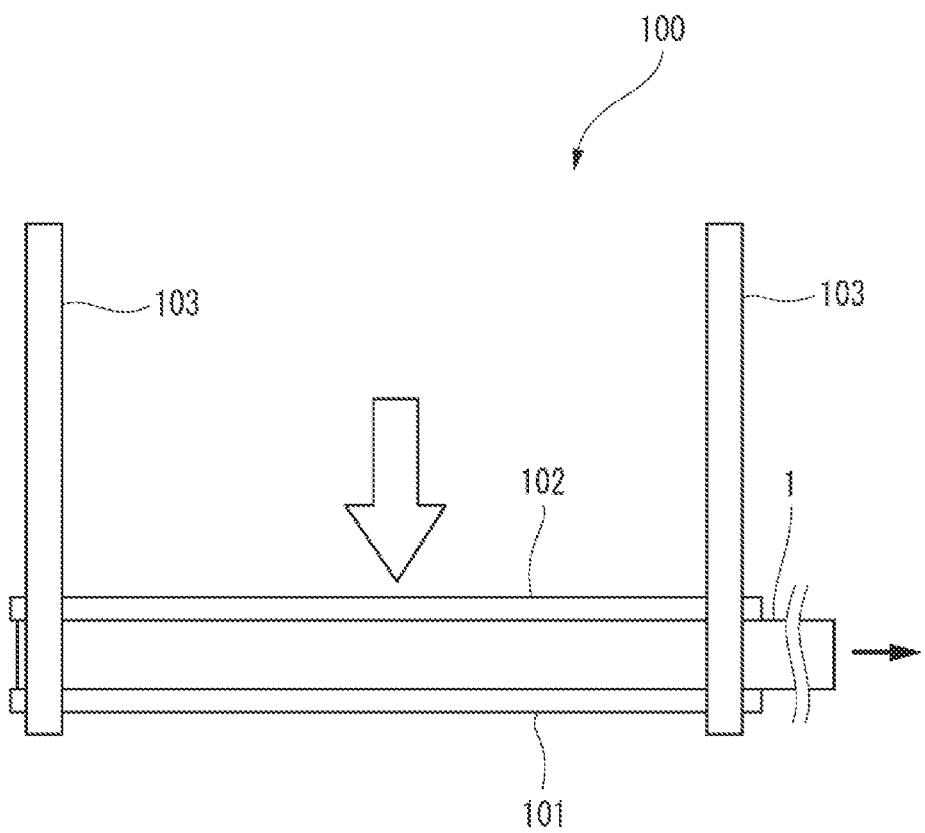
FIG. 5 is a view illustrating an apparatus used for calculating a static friction coefficient of the optical fiber cable according to the aspect of the present embodiment.

In order to calculate the static friction coefficient of the optical fiber cable 1, the inventors of the present disclosure conducted an experiment using an apparatus 100 illustrated in FIG. 5. As illustrated in FIG. 5, the apparatus 100 includes a first metal plate 101, a second metal plate 102, and four cylindrical members 103. The four cylindrical members 103 are inserted through holes provided at four corners of the first metal plate 101 and the second metal plate 102, respectively. In FIG. 5, only two cylindrical members 103 are shown for convenience of illustration. Further, likewise the wall surface of the duct 10, the first metal plate 101 and the second metal plate 102 are flat plates formed of stainless steel.

The inventors and calculated a static friction coefficient of the optical fiber cable 1 with a method of inserting the optical fiber cable 1 between the first metal plate 101 and the second metal plate 102 disposed above the first metal plate 101 and pulling the optical fiber cable 1 in the longitudinal direction (rightward direction in FIG. 5) of the metal plate in a state where load is applied with respect to the second metal plate 102. The load applied to the second metal plate 102 was 0.5 kg. The longitudinal length of the first metal plate 101 and the second metal plate 102 was about 150 mm. The pulling speed for the optical fiber cable 1 was about 500 mm/min. Further, according to the present embodiment, the static friction coefficient is evaluated by using an average value of the traction tension.

The result of the above experiment showed that the average static friction coefficient of the optical fiber cable including the sheath material not added with silicone was 0.54. Meanwhile, the static friction coefficient of the optical fiber cable 1 including the sheath material 3 added with 0.2% by mass of silicone was 0.46, the static friction coefficient of the optical fiber cable 1 including the sheath material added with 0.3% by mass of silicone was 0.36, the static friction coefficient of the optical fiber cable 1 including the sheath material 3 added with 0.5% by mass of silicone was 0.30, and, the static friction coefficient of the optical fiber cable 1 including the sheath material 3 added with 1.5% by mass of silicone was 0.20. When concentration of silicone added to the sheath material 3 was 0.2% or less by mass, the static friction coefficient was approximately the same as that of the optical fiber cable including the sheath material not added with silicone. Conversely, if the concentration of silicone added to the sheath material 3 is 1.5% or more by mass, the decrease rate in the static friction coefficient of the optical fiber cable 1 is slowed such that sufficient effect for the cost cannot be obtained. From these results, the inventors confirmed that the concentration of silicone added to the sheath material 3 of the optical fiber cable 1 is preferably 0.2% or more by mass and 1.5% or less by mass.

(Measurement of Traction Tension when Laying Optical Fiber Cable 1)

Figure 6:
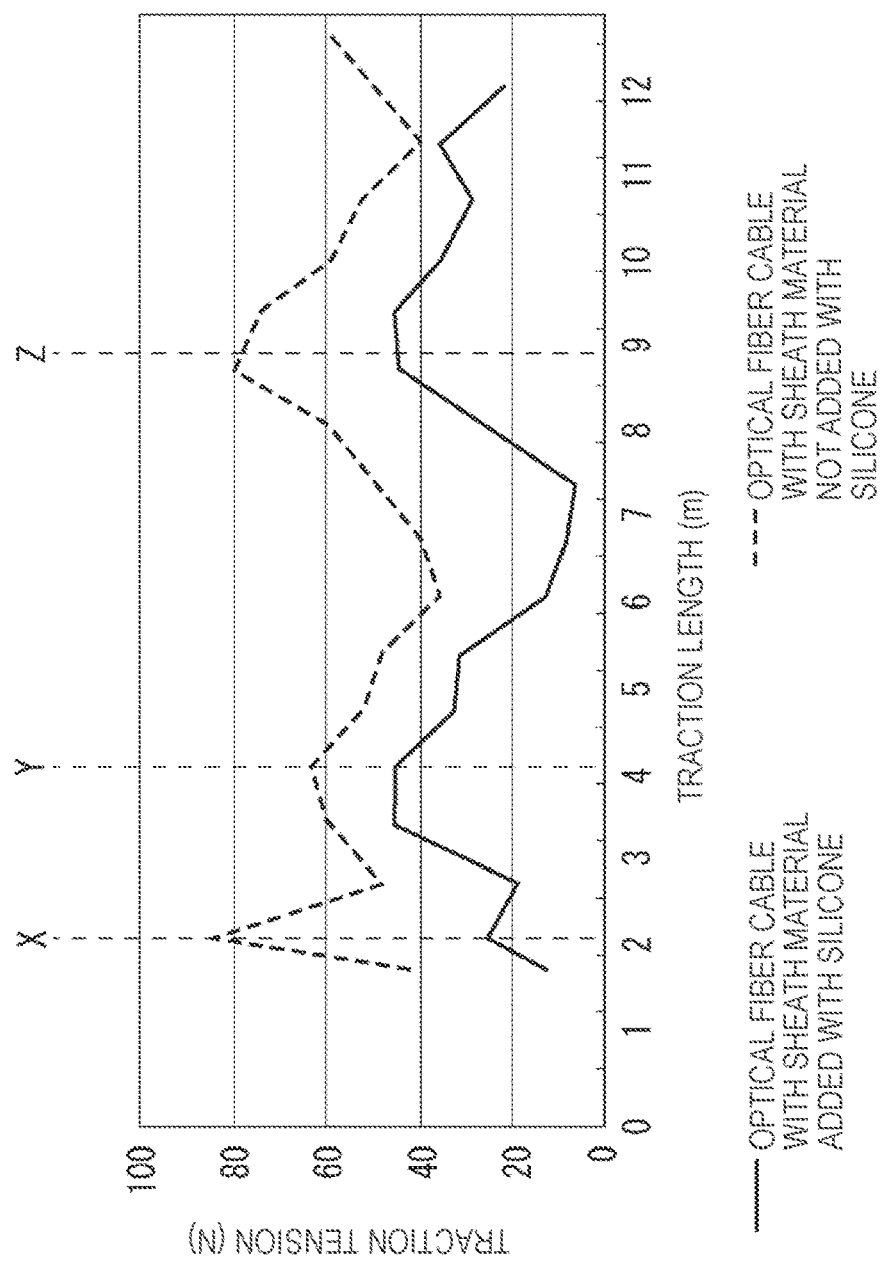
FIG. 6 is a view illustrating a traction tension with respect to traction length.

FIG. 6 is a view illustrating the traction tension with respect to traction length. An intersection point of a straight line X extending in the vertical direction (up-down direction) in FIG. 6 and each line graph represents the traction tension at a time point when the tip of the optical fiber cable 1 reaches point X in FIG. 4. An intersection point of a straight line Y and each line graph represents the traction tension at a time point when the tip of the optical fiber cable 1 reaches point Y in FIG. 4. An intersection point of a straight line Z and each line graph represents the traction tension at a time point when the tip of the optical fiber cable 1 reaches point Z in FIG. 4.

Figure 4:
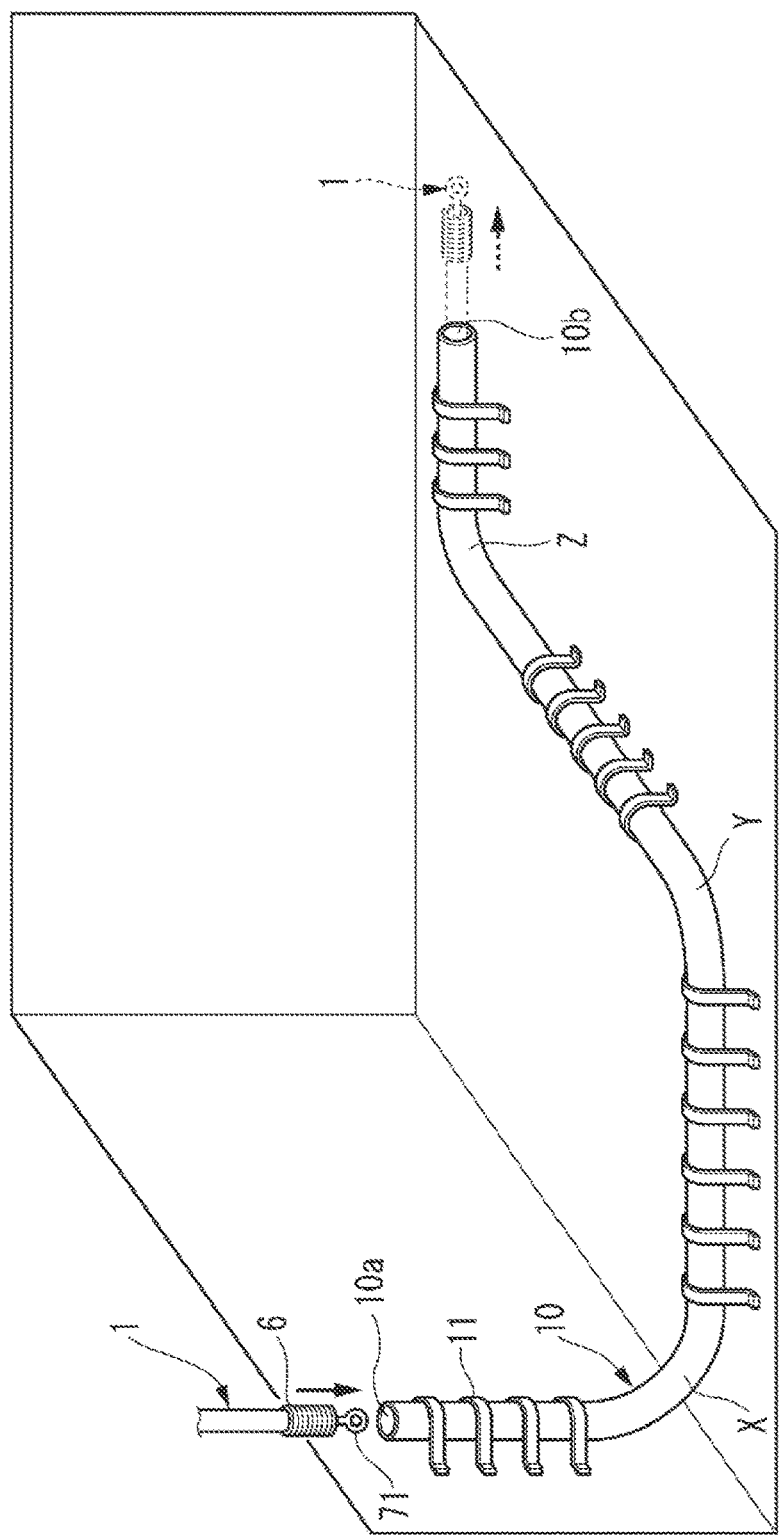
FIG. 4 is a view illustrating a method for laying an optical fiber cable according to the aspect of the present embodiment.

Through the duct 10 illustrated in FIG. 4, the inventors passed the optical fiber cable including the sheath material not added with silicone and the optical fiber cable 1 including the sheath material 3 added with 0.3% by mass of silicone, respectively, and measured the traction tension when laying each optical fiber cable.

As a result of the above experiment, the inventors confirmed that the traction tension required to pass the optical fiber cable 1 including the sheath material 3 added with 0.3% by mass of silicone through the duct 10 is approximately the half of the traction tension required to pass the optical fiber cable including the sheath material not added with silicone through the duct 10. The inventors also confirmed that, when the optical fiber cable 1 including the sheath material 3 added with 0.3% by mass of silicone is passed through the duct 10, there is almost no damage to the optical fiber cable 1 due to the friction occurring between the optical fiber cable 1 and the duct 10.

(Measurement of Bending Rigidity of Optical Fiber Cable 1)

If the bending rigidity of the optical fiber cable 1 is too high, handling is deteriorated, and if the bending rigidity is changed more than 5% of an average value of the bending rigidity in the circumferential direction, a direction where bending can occur easily is generated, making it difficult to pass the wire through. As described above, because the bending rigidity is a parameter that influences the cable passing property of the optical fiber cable 1, the inventors also calculated the bending rigidity of the optical fiber cable 1 using a double-end support tension method. The bending rigidity of the optical fiber cable 1 was calculated based on the repulsive force of the optical fiber cable 1, where the length of the optical fiber cable 1 was 700 mm, the distance between the jigs was 500 mm, the pressing speed was 200 mm/min, and the displacement of the indenter was 10 mm.

As a result, the inventors confirmed that the bending rigidity of the optical fiber cable 1 was 15 N·mm$^2$ or more and 25 N·mm$^2$ or less. The inventors also confirmed that the bending directionality of the optical fiber cable 1 is small because the tension member 54 is located at the center. Specifically, as a result of measuring the average value and variation of the bending rigidity while varying the measurement position in the longitudinal direction or varying the bending direction, it was confirmed that a value of variation amount of the bending rigidity falls within 5% of the average value of the bending rigidity.

In the optical fiber cable 1 as described above, the multi-fiber connector 5 is connected to the end of the optical fiber 20. Therefore, even when the cable main body 2 is the ultra-high-fiber-count optical cable that requires a considerable amount of time for fusion-splicing, the time required for fusion-splicing can be shortened. In addition, because the sheath material 3 includes 0.2% or more by mass and 1.5% or less by mass of silicone, when laying the optical fiber cable 1 in the duct 10 by the pulling method, the static friction coefficient of the optical fiber cable 1 and the duct 10 can be reduced. Therefore, since the optical fiber cable 1 has a good cable passing property, the work efficiency during laying of the optical fiber cable 1 can be improved.

Further, in the optical fiber cable 1 as described above, the static friction coefficient between the sheath material 3 including 0.2% or more by mass and 1.5% or less by mass of silicone, and the first metal plate 101 and the second metal plate 102 formed of stainless steel is 0.20 or more and 0.46 or less. Since the average static friction coefficient between the sheath material not added with silicone and the first metal plate 101 and the second metal plate 102 is 0.54, the optical fiber cable 1 including the sheath material 3 has an improved cable passing property in the duct 10.

Further, in the optical fiber cable 1 described above, the cross section of the sheath material 3 has a polygonal shape, and the portion (contact portion 3a) where the duct 10 and the optical fiber cable 1 contact with each other is the point contact in the cross section of the optical fiber cable 1. Therefore, the friction generated between the duct 10 and the optical fiber cable 1 is reduced compared to when a portion where the duct 10 and the optical fiber cable 1 contact with each other is a surface contact in the cross section of the optical fiber cable 1. Therefore, the cable passing property of the optical fiber cable 1 in the duct 10 can be improved.

Second Embodiment

Figure 7:
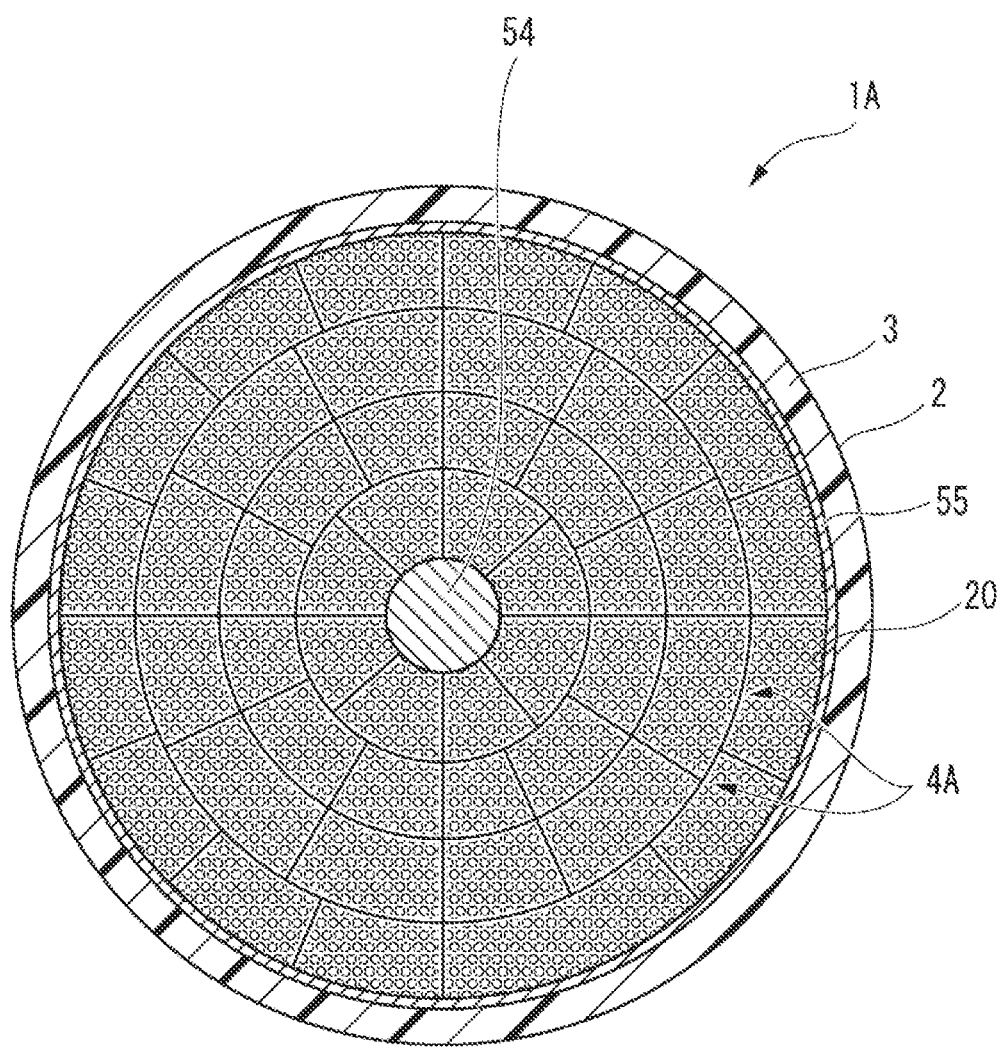
FIG. 7 is a cross-sectional view of another optical fiber cable according to an aspect of the present embodiment.

An optical fiber cable 1A according to an embodiment will be described with reference to FIG. 1. In the description of the embodiment, the same reference numerals are given to the parts that overlap with those of the description of the first embodiment, and the description thereof will be omitted as appropriate. As illustrated in FIG. 7, the optical fiber cable 1A differs from the optical fiber cable 1 in that the optical fiber cable 1A has a slotless structure with no slot rod, and that it has a large number of fibers.

The optical fiber cable 1A includes 48 subunits 4A. The subunit 4A includes 288 optical fibers 20. Therefore, the optical fiber cable 1A includes 13824 optical fibers 20. The outer diameter of the cable main body 2 of the optical fiber cable 1A is 35.5 mm. Further, according to the present embodiment, the outer diameter of the optical fibers 20 is 160 μm or more and 185 μm or less, and the density of the optical fibers 20 in the optical fiber cable 1A is 10 fiber/mm$^2$ or more. Therefore, the density of the optical fibers 20 in the optical fiber cable 1A is higher than the density of the optical fibers 20 in the optical fiber cable 1.

Since the optical fiber cable 1A can receive therein the optical fibers 20 with high density without excessively increasing size of the cable main body 2, the optical fiber cable 1A can be passed through the duct 10. Also in this embodiment, the pitch of the optical fibers 20 can be changed from 200 μm to 250 μm to provide compatibility with the multi-fiber connector 5, thereby reducing the fusion-splicing time.

As described above, while the present disclosure has been described in detail and with reference to specific embodiments thereof, it will be apparent to those skilled in the art that various changes and modifications can be made without departing from the spirit and scope of the present disclosure. Further, the number, the position, the shape, and the like of the above-described constituent members are not limited to the above embodiments, and can be changed to a suitable number, position, shape, and the like for implementing the present disclosure.

In the first embodiment, the cross section of the sheath material 3 is in polygonal shape, but it may be circular, for example.

According to the embodiment described above, the optical fiber cable 1 includes the pitch conversion part 8, but the pitch conversion part 8 may be excluded.

According to the above embodiment, the multi-fiber connector 5 is attached to the end of the optical fiber ribbon 40, but it may also be attached to another end of the optical fiber ribbon 40. In this case, the flexible tube 6 may be provided at both ends of the optical fiber cable 1.

According to the above embodiment, the glass fiber diameter of the optical fiber 20 is preferably 80 μm or more and 120 μm or less. For example, when the outer diameter of the optical fibers 20 is about 165 μm and the glass diameter of the glass fiber of the optical fibers 20 is about 125 μm, there is a risk in which the coating thickness of the optical fibers 20 becomes thinner and the mechanical strength is reduced. Therefore, by setting the glass diameter of the glass fiber of the optical fibers 20 to 80 μm or more and 120 μm or less, it is possible to prevent the decrease in the coating thickness, and as a result, prevent the reduction in the mechanical strength of the optical fiber cables 1 and 1A.

REFERENCE SIGNS LIST 1, 1A: optical fiber cable
2: cable main body
3: sheath material
3A: contact portion
4, 4A: subunit
5: multi-fiber connector
6: flexible tube
7: pulling eye
8: pitch conversion part
10: duct
10a: inlet
10b: outlet
20 (20A to 20L): optical fiber
40: optical fiber ribbon
41: fiber adhesive part
42: non-adhesive part
43: connecting resin
52: slot rod
54: tension member
55: pressing and winding tape
71: annular portion
72: cylindrical portion
100: apparatus
101: first metal plate
102: second metal plate
103: cylindrical member
400: first end

What is claimed is:

1. An optical fiber cable comprising:
a cable main body comprising 3000 or more optical fibers and a sheath material receiving therein the optical fibers; and
a multi-fiber connector connected to ends of the optical fibers,
wherein the sheath material includes 0.2% or more by mass and 1.5% or less by mass of silicone, and
wherein a static friction coefficient between the sheath material and a flat plate formed of stainless steel is 0.20 or more and 0.46 or less.

2. The optical fiber cable according to claim 1, wherein a cross section of the sheath material is in a polygonal shape.

3. The optical fiber cable according to claim 1, wherein a bending rigidity of the optical fiber cable is 25 N·mm$^2$ or less, and a variation amount of the bending rigidity in a circumferential direction of the optical fiber cable is within 5% of an average value of the bending rigidity.

4. The optical fiber cable according to claim 1, further comprising a flexible tube provided on at least one end of the cable main body,
wherein the multi-fiber connector is received in the flexible tube.

5. The optical fiber cable according to claim 4, wherein an outer diameter of the flexible tube and an outer diameter of the cable main body are 60 mm or less.

6. The optical fiber cable according to claim 1, wherein a glass diameter of the optical fibers is 80 μm or more and 120 μm or less.

7. An optical fiber cable comprising:
a cable main body comprising 3000 or more optical fibers and a sheath material receiving therein the optical fibers; and
a multi-fiber connector connected to ends of the optical fibers,
wherein the sheath material includes 0.2% or more by mass and 1.5% or less by mass of silicone,
wherein, while the optical fibers are arranged in parallel, the optical fibers are configured as an optical fiber ribbon with fiber adhesive parts and non-adhesive parts in which the fiber adhesive parts where adjacent optical fibers between some or all of the optical fibers are connected to each other, and the non-adhesive parts where the adjacent optical fibers between some or all of the optical fibers are not connected to each other are intermittently provided in a longitudinal direction,
wherein the optical fiber cable further comprises a pitch conversion part that is provided between a first end of the optical fiber ribbon and the multi-fiber connector and converts pitch of the optical fibers,
wherein the pitch of the optical fibers in the multi-fiber connector is longer than the pitch of the optical fibers in the optical fiber ribbon,
wherein an outer diameter of the optical fiber is 160 μm or more and 185 μm or less, and
wherein a core density of the cable main body is 10 fiber/mm$^2$ or more.

* * * * *